United States Patent
Zhen et al.

(10) Patent No.: US 11,418,766 B2
(45) Date of Patent: Aug. 16, 2022

(54) APPARATUS AND METHOD FOR CHROMA PROCESSING FOR MULTI-FRAME FUSION

(71) Applicant: Samsung Electronics Co., Ltd., Suwon-si (KR)

(72) Inventors: Ruiwen Zhen, Allen, TX (US); John W. Glotzbach, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/717,971

(22) Filed: Dec. 17, 2019

(65) Prior Publication Data

US 2021/0185287 A1 Jun. 17, 2021

(51) Int. Cl.
*H04N 9/64* (2006.01)
*H04N 9/07* (2006.01)

(52) U.S. Cl.
CPC .............. *H04N 9/646* (2013.01); *H04N 9/07* (2013.01)

(58) Field of Classification Search
None
See application file for complete search history.

(56) References Cited

U.S. PATENT DOCUMENTS

| | | | |
|---|---|---|---|
| 8,724,895 B2 | 5/2014 | Lin et al. | |
| 8,989,484 B2 | 3/2015 | Moon et al. | |
| 9,113,025 B2 | 8/2015 | Rubshtein et al. | |
| 9,836,670 B2 | 12/2017 | Kim et al. | |
| 10,643,316 B2 | 5/2020 | Kim et al. | |
| 10,708,525 B2* | 7/2020 | Pourreza Shahri | H04N 5/35581 |
| 2014/0307960 A1 | 10/2014 | Sharma et al. | |
| 2015/0245049 A1 | 8/2015 | Lee et al. | |
| 2017/0278225 A1* | 9/2017 | Nishimura | G06T 5/002 |
| 2017/0309306 A1 | 10/2017 | Subramaniam et al. | |
| 2019/0238817 A1 | 8/2019 | Jun et al. | |
| 2019/0260992 A1 | 8/2019 | Jin et al. | |

FOREIGN PATENT DOCUMENTS

| | | |
|---|---|---|
| KR | 10-2009-0010906 A | 1/2009 |
| KR | 10-2013-0013288 A | 2/2013 |
| KR | 10-2018-0132210 A | 12/2018 |
| KR | 10-2019-0048753 A | 5/2019 |
| KR | 20190048753 A | 5/2019 |

OTHER PUBLICATIONS

International Search Report and Written Opinion of the International Searching Authority dated Nov. 11, 2020 in connection with International Patent Application No. PCT/KR2020/010535, 13 pages.

* cited by examiner

*Primary Examiner* — Timothy J Henn
*Assistant Examiner* — Fayez A Bhuiyan (57) ABSTRACT

A method includes receiving a reference input frame and a non-reference input frame; separating a luma plane for a luma channel and a chroma plane for a chroma channel for each of the reference input frame and the non-reference input frame; generating a luma frame using the luma plane; generating a chroma frame using the chroma plane in a patch-based chroma blending; and combining the luma frame and the chroma frame into an output frame.

20 Claims, 7 Drawing Sheets

Luma channel blend Map
FIG. 5B

Chroma channel blend Map
FIG. 5C

APPARATUS AND METHOD FOR CHROMA PROCESSING FOR MULTI-FRAME FUSION

TECHNICAL FIELD

This disclosure relates generally to image capturing systems. More specifically, this disclosure relates to an apparatus and method for chroma processing for multi-frame fusion and an algorithm that can reduce unpleasant Chroma noise in motion areas of final composited image for multi-frame fusion applications, such as burst denoising and motion blur reduction.

BACKGROUND

In the context of multi-frame fusion, a computationally efficient way to handle scene motions is to detect inconsistencies in non-reference frames compared to the reference frame (after a sequential pre-processing steps, including histogram match and frame alignment) and discard potential ghost pixels in fusion of both luma and chroma channels. This solution could achieve noise reduction in static areas, but leave excessive noise on motion area, and even noise boundary between static area and motion area. Thus, different de-noising techniques have been exploited after de-ghosting to reduce motion area noise.

SUMMARY

This disclosure provides an apparatus and method for chroma processing for multi-frame fusion.

In a first embodiment, a method includes receiving a reference input frame and a non-reference input frame; separating a luma plane for a luma channel and a chroma plane for a chroma channel for each of the reference input frame and the non-reference input frame; generating a luma frame using the luma plane; generating a chroma frame using the chroma plane in a patch-based chroma blending; combining the luma frame and the chroma frame into an output frame; and outputting the output frame for further downstream processing, save to file, transmit over network, or to a display.

In a second embodiment, an electronic device includes at least one sensor and at least one processing device. The at least one processing device is configured to receive a reference input frame and a non-reference input frame; separate a luma plane for a luma channel and a chroma plane for a chroma channel for each of the reference input frame and the non-reference input frame; generate a luma frame using the luma plane; generate a chroma frame using the chroma plane in a patch-based chroma blending; combine the luma frame and the chroma frame into an output frame; and output the output frame.

In a third embodiment, a non-transitory machine-readable medium contains instructions that when executed cause at least one processor of an electronic device to receive a reference input frame and a non-reference input frame; separate a luma plane for a luma channel and a chroma plane for a chroma channel for each of the reference input frame and the non-reference input frame; generate a luma frame using the luma plane; generate a chroma frame using the chroma plane in a patch-based chroma blending; combine the luma frame and the chroma frame into an output frame; and output the output frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings. Removing luma noise is considered as almost solved; but removing chroma noise at a moderate cost is still an open issue. Embodiments of the present disclose provide a separate de-ghosting algorithm for chroma channel to reduce disturbing chroma noise on motion area and avoid chroma boundary. Based on the observation that chroma channel is dominated by low-frequency information, the system, method, and algorithm blends corresponding chroma patches instead of pixels with a shrinkage operator. The patch-based blending effectively achieves chroma noise reduction without introducing noticeable ghost artifacts.

Figure 1:
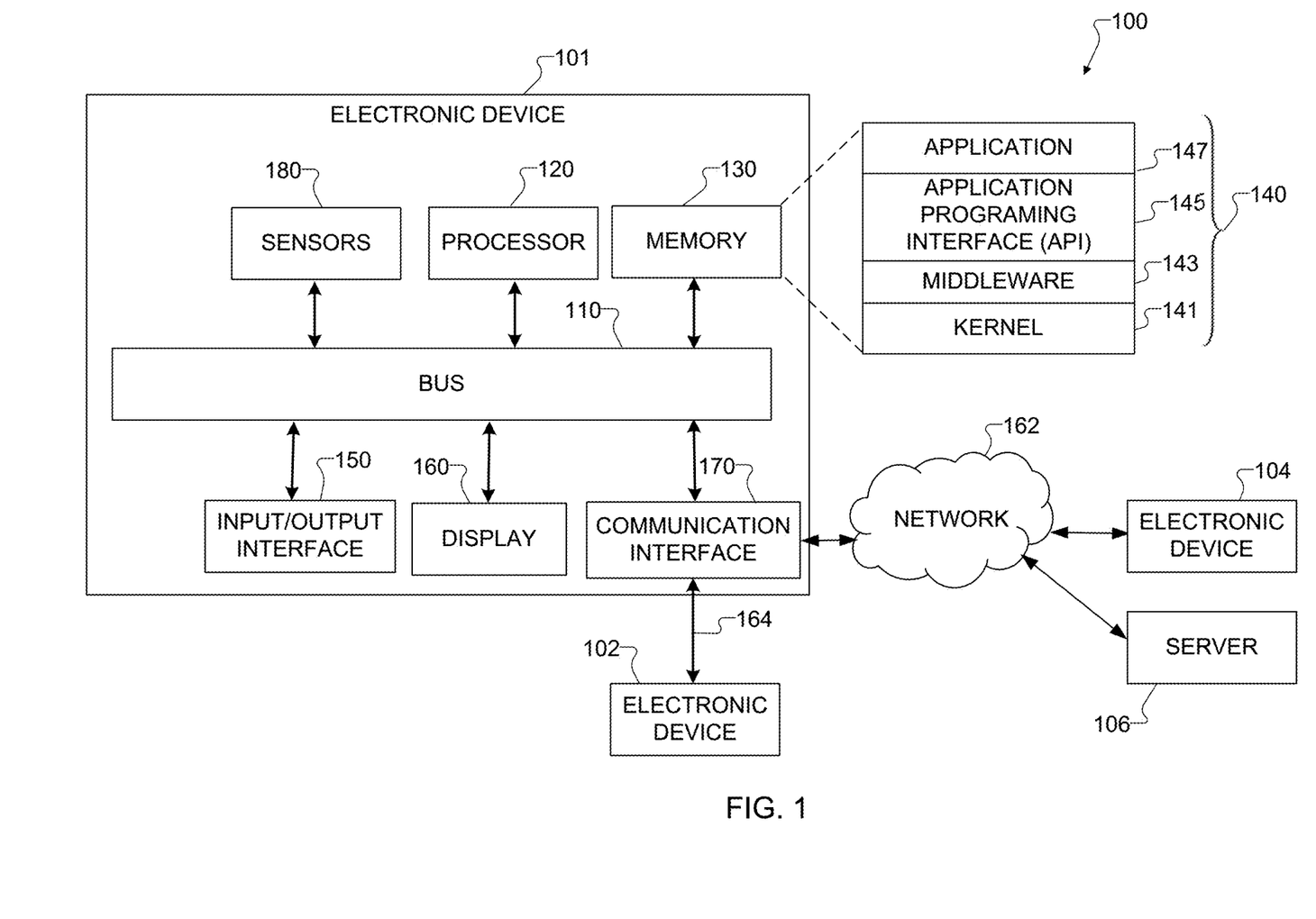
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 performs control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) to generate high dynamic range (HDR) images of dynamic scenes using graph cut-based labeling, or a motion blur reduction (MBR) image in which the motion blur of moving objects is reduced.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 displays, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, sets up communication between the electronic device 101 and an external electronic device (such as a first electronic device 102, a second electronic device 104, or a server 106). For example, the communication interface 170 can be connected to a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving connection with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
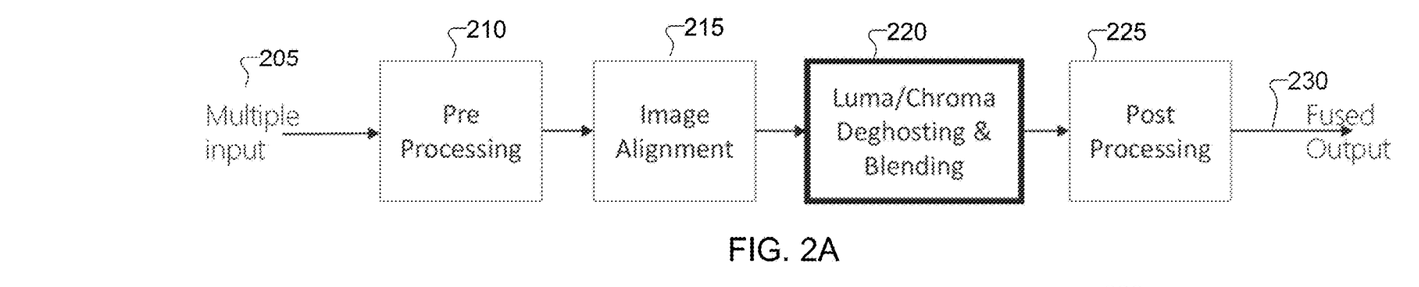
FIGS. 2A and 2B illustrate an example process for chroma processing for multi-frame fusion in accordance with this disclosure.
Figure 2B:
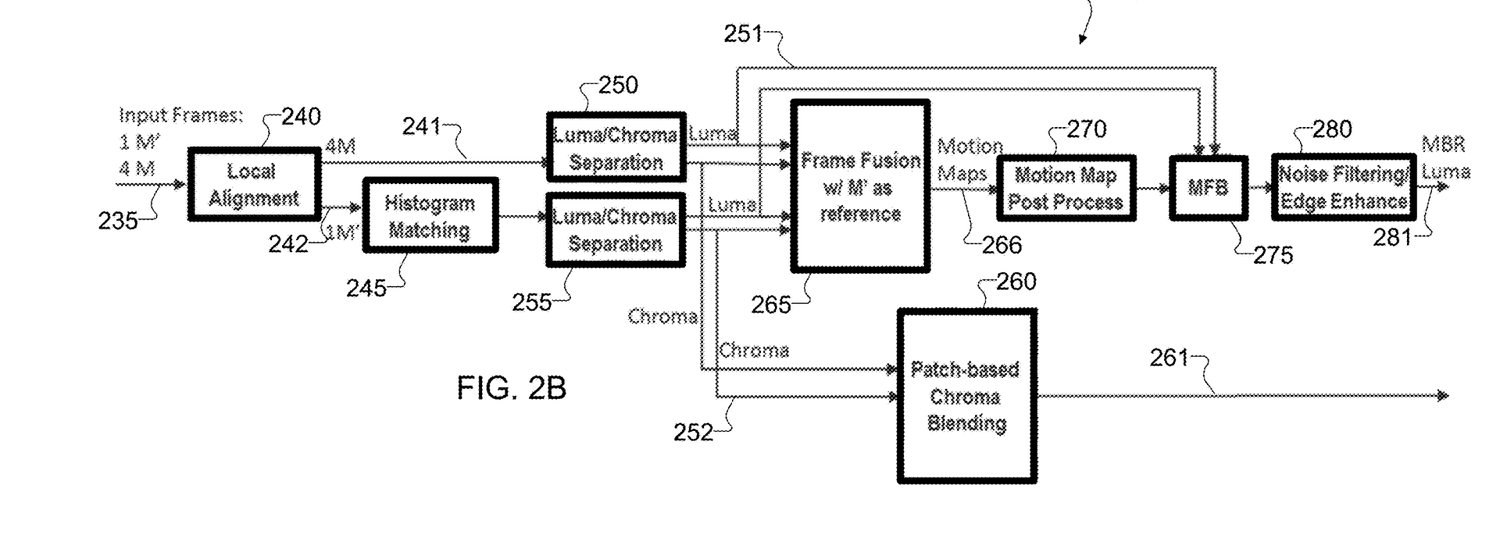

FIGS. 2A and 2B illustrate an example process for efficient regularized image alignment using a multi-frame fusion algorithm in accordance with this disclosure. For ease of explanation, the process 200 shown in FIG. 2 is described as being performed using the electronic device 101 shown in FIG. 1. However, the process 200 shown in FIG. 2 could be used with any other suitable electronic device and in any suitable system.

The process 200 includes steps to capture multiple image frames of a scene at different exposures and process the image frames to generate a fused output. The fused imaged is blended using an additional chroma processing to reduce ghosting and blurring in images.

The process 200 involves the capture of multiple image frames 205. In the example shown in FIG. 2A, two image frames are captured and processed, although more than two image frames may also be used. The image frames 205 are captured at different exposures, such as when one image frame 205 is captured using an automatic exposure ("auto-exposure") or other longer exposure and the image frame 205 is captured using a shorter exposure (compared to the automatic or a longer exposure). An auto-exposure generally refers to an exposure that is automatically, such as without intervening human action, determined by a camera or other device, typically with little or no user input. In some embodiments, a user is allowed to specify an exposure mode (such as portrait, landscape, sports, or other modes), and the automatic exposure can be generated based on the selected exposure mode without any other user input. Each exposure setting is typically associated with different settings for the camera, such as different apertures, shutter speeds, and camera sensor sensitivities. A shorter-exposure image frame is typically darker, lacks image details, and has more noise compared to an auto-exposure or other longer-exposure image frame. As a result, the shorter-exposure image frame may include one or more regions that are under-exposed, while the auto-exposure or other longer-exposure image frame may include one or more regions that are over-exposed. In some embodiments, the short-exposure frame may only have a shorter exposure time, but has a higher ISO to match the overall image brightness of the auto-exposure or long-exposure frame. Note that while often described below as involving the use of an auto-exposure image frame and at least one shorter-exposure image frame, embodiments of the present disclosure may be used with any suitable combination of image frames captured using different exposures.

In some instances, during a capture operation, the processor 120 can control the camera of the electronic device 101 so that the image frames 205 are captured rapidly, such as in a burst mode. A capture request that triggers the capture of the image frames 205 represents any suitable command or input indicating a need or desire to capture an image of a scene using the electronic device 101. For example, the capture request could be initiated in response to a user's pressing of a "soft" button presented on the display 160 or the user's pressing of a "hard" button. In the illustrated example, two image frames 205 are captured in response to the capture request, although more than two images could be captured. The image frames 205 may be produced in any suitable manner, such as where each image frame is simply captured by a camera or where a multiple-frame fusion technique is used to capture multiple initial image frames and combine them into one or more of the image frames 205.

During subsequent operations, one image frame 205 can be used as a reference image frame, and the other image frame 205 can be used as a non-reference image frame. Depending on the circumstances, the reference image frame may represent the auto-exposure or other longer-exposure image frame, or the reference image frame may represent the shorter-exposure image frame. In some embodiments, the auto-exposure or other longer-exposure image frame may be used as the reference image frame by default, since this typically allows the image frame with greater image details to be used more when generating a composite or final image of a scene. However, as described below, there may be some instances in which this is not desirable (such as due to the creation of image artifacts), in which case the shorter-exposure image frame may be selected as the reference image frame.

In the pre-processing operation 210, the raw image frames are pre-processed in some manner to provide part of the image processing. For instance, the pre-processing operation 210 can perform a white balancing function to change or correct the color balance in the raw image frames. For example, the pre-processing operation 210 also can perform a function to reconstruct full color image frames from incomplete color samples contained in the raw image frames using a mask (such as a CFA mask).

As shown in FIG. 2A, the image frames 205 are provided to an image alignment operation 215. The image alignment operation aligns the image frames 205 and produce aligned image frames. For example, the image alignment operation 215 can modify the non-reference image frame so that particular features in the non-reference image frame align with corresponding features in the reference image frame. In this example, the aligned image frame represents an aligned version of the reference image frame, and the aligned image frame represents an aligned version of the non-reference image frame. Alignment may be needed to compensate for misalignment caused by the electronic device 101 moving or rotating between image capture events, which causes objects in the image frames 205 to move or rotate slightly (as is common with handheld devices). The image frames 205 can be aligned both geometrically and photometrically. In some embodiments, the image alignment operation 215 can use global Oriented FAST and Rotated BRIEF (ORB) features and local features from a block search to align the image frames, although other implementations of the image registration operation could also be used. Note that the reference image frame here may or may not be modified during the alignment, and the non-reference image frame could represent the only image frame that is modified during the alignment.

The aligned image frame (the non-reference image frame) can be histogram matched as part of the pre-processing operation 210. Histogram matches a histogram of the non-reference image frame to a histogram of the reference image frame, such as by applying a suitable transfer function to the aligned image frame. For example, histogram matching can operate to make the brightness level generally equal for both aligned image frames. Histogram matching may involve increasing the brightness of the shorter-exposure image frame to substantially match the brightness of the auto-exposure or other longer-exposure image frame, although the converse may occur. This also results in the generation of a pre-processed aligned image frame associated with the aligned image frame.

The aligned image frame is then blended in a blending operation 220. The blending operation 220 blends or otherwise combines the pixels from the image frames based on the label map(s) in order to produce at least one final image of a scene. The final image generally represents a blend of the image frames, where each pixel in the final image is extracted from either the reference image frame or the non-reference image frame (depending on the corresponding value in the label map). Additional image processing operations can occur once the proper pixels are extracted from the image frames and used to form an image. Ideally, the final image has little or no artifacts and improved image details, even in areas where at least one of the image frames 205 were over-exposed or under-exposed. More details regarding the details of the blending operation 220 are described in relation to FIG. 2B.

The blended frames then are put through a post-processing operation 225. The post-processing operation 225 can perform any processing to the blended image to complete the fused output image 230.

FIG. 2B illustrates a luma and chroma de-ghosting and blending operation 220 in accordance with this disclosure. The blending operation 220 receives input frames 235 that have been aligned in the image alignment operation 215. A local alignment 240 of the input images 235 is performed. For example, the input images 235 could be a total of five images that include one short exposure image, designated as an M' image and four normal exposure images, designated as 4M images. The local alignment 240 can perform a local alignment of the 4M images and the 1M' image. The local alignment 240 can output the 4M alignment information 241 to a first luma/chroma separation 250 and the 1M' alignment information 242 to a histogram matching 245.

After the input images 235 are locally aligned in local alignment 240, a 1M' image is processed in a histogram matching operation 245 and the 4M images are sent to a luma/chroma separation operation 250. A luma/chroma separation operation 255 receives and processes the 1M' image output from the histogram matching operation 245. The histogram matching operation 245 can modify the 1M' image based on scalar data of the 4M images. The results from the histogram matching operation 245 are output to a luma/chroma separation operation 255.

The luma/chroma separation operations 250 and 255 process the images 1M' and 4M into a luma frame 251 and a chroma frame 252. The luma frame 251 represents the brightness of the 1M' image and 4M images. The chroma frame 252 represents the color information of the 1M' image and the 4M images. The luma frames 251 from both of the luma/chroma separation operations 250 and 255 are output to a frame fusion operation 265 and a multi-frame blending (MFB) operation 275. The chroma frames 252 from both of the luma/chroma separation operations 250 and 255 are output to the frame fusion operation 265 and a patch-based chroma blending operation 260.

The frame fusion operation 265 can fuse the 1M' image and the 4M image using the luma information, the chroma information, and the 1M' image as a reference. In general, any input image can be used as a reference image, but for simplicity of discussion the 1M' image that was processed in the histogram matching operation 245 can be used as the reference image. The frame fusion operation 265 can fuse the 1M' image and the 4M image into a motion map 266 for outputting to a motion map post process operation 270. The motion map post processing uses the motion map 266 for post processing operation and outputs the processed information to the MFB 275. The MFB 275 blends the luma frames 251 into a single luma frame output to the noise filtering and edge enhancement operation 280. The noise filtering and edge enhancement operation 280 performs noise filtering and edge enhancement to the luma frame. The final output is a motion blur reduction (MBR) luma frame 281.

The patch-based chroma blending receives the chroma frames 252 from the luma/chroma separation operations 250 and 255. The patch-based chroma blending operation 260 will be described in greater detail in relation to FIGS. 3A-5E. The patch-based chroma blending operation outputs an MBR chroma frame 261.

Although FIGS. 2A and 2B illustrate one example of a process for motion blur reduction (MBR) image creation of a dynamic scene using chroma processing, various changes may be made to FIGS. 2A and 2B. For example, while shown as a specific sequence of operations, various operations shown in FIGS. 2A and 2B could overlap, occur in parallel, occur in a different order, or occur any number of times. Also, the specific operations shown in FIGS. 2A and 2B are examples only, and other techniques could be used to perform each of the operations shown in FIGS. 2A and 2B.

Figure 3A:
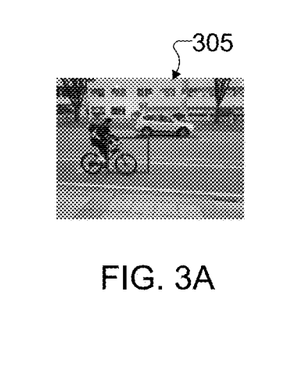
FIGS. 3A and 3B illustrate an example deghosting and blending using the same deghosting map for luma and chroma channels in accordance with this disclosure.
Figure 3B:
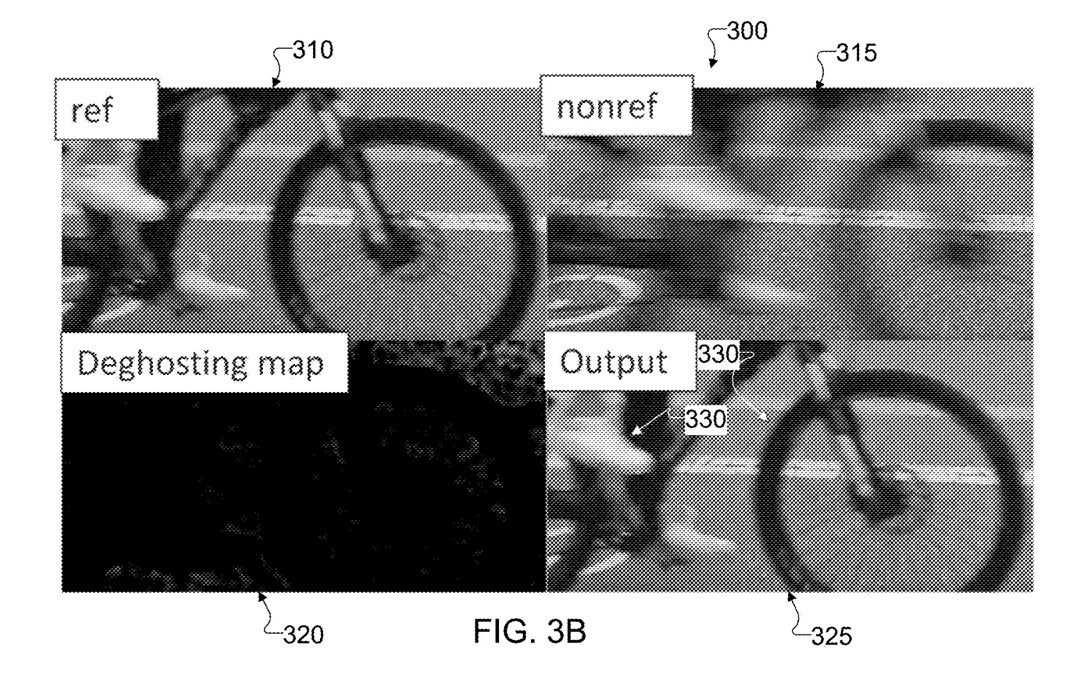

FIGS. 3A and 3B illustrate an example deghosting and blending operation using the same deghosting map for luma and chroma channels in accordance with this disclosure. In particular, FIGS. 3A and 3B illustrate how the process 200 shown in FIG. 2A may be used to generate a label map for use in generation of a deghosting and blending. For ease of explanation, the deghosting and blending operation here is described as being performed using the electronic device 101 of FIG. 1, although any other suitable electronic device in any suitable system may be used.

As shown in FIGS. 3A and 3B, two image frames 310 and 315 of a scene 305 have been captured. In this particular example, the scene 305 includes a person riding a bicycle on a street with a car driving across the same street in front of various natural objects (such as trees and bushes) and artificial structures (such as a building and lampposts). The image frame 315 represents an auto-exposure image frame or other longer-exposure image frame captured of the scene, while the image frame 310 represents a shorter-exposure image frame captured of the scene. Because the image frame 315 has a longer exposure than the image frame 310, the image frame 315 is affected by the motion of the person peddling the bicycle. The motion causes the image frame 315 to make the bicycle look blurry.

After the reference image frame 310 and non-reference image frame 315 are pre-processed and image aligned, the labeling operation deghosting and blending operation is performed. As can be seen in the deghosting map 320, the amount of details that are discernable in the ghosting map 320 are minimal. Given this particular scene, this is generally to be expected since the image frame 315 contains more motion blur than the image frame 310, on account of moving objects. The motion area suffers in the output image 325 from both excessive luma and chroma noise 330. Normally, Chroma noise is more difficult to control and more disturbing than luma noise. As seen in the output image 325, artifacts 330 remain after the output image 325 is fully processed. The artifacts 330 can be caused by blurring or ghost images. The artifacts 330 appear on the top edge of the shoe that the rider is wearing and on a back outside edge of the wheel of the bicycle.

Figure 4A:
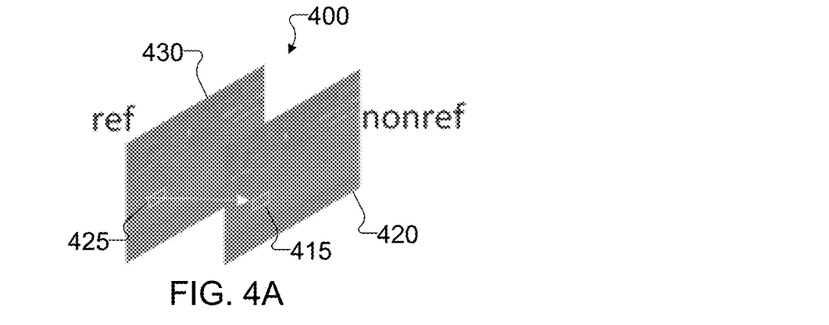
FIGS. 4A and 4B illustrate another example patch-based chroma blending in accordance with this disclosure.
Figure 4B:
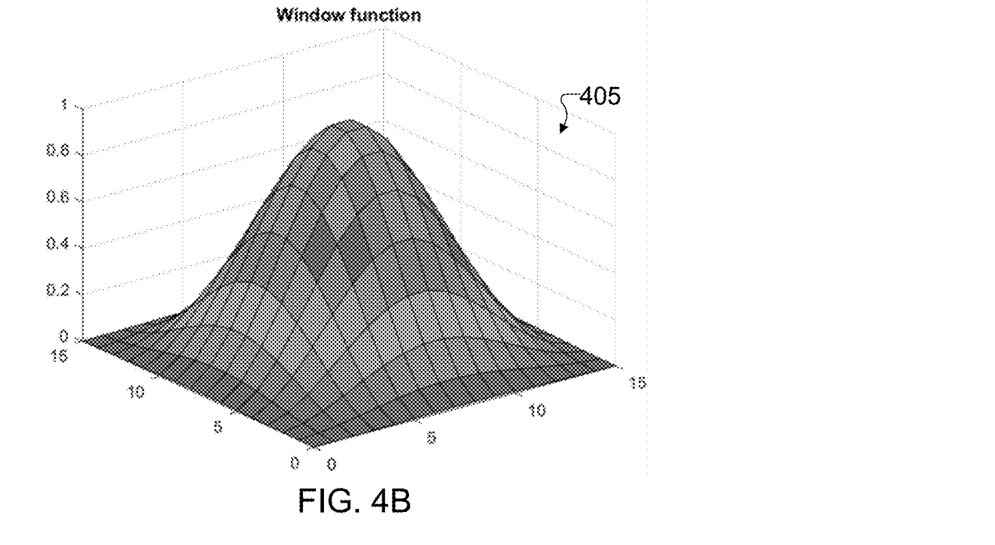

FIGS. 4A and 4B illustrate another example patch-based chroma blending in accordance with this disclosure. In particular, FIGS. 4A and 4B illustrate how the luma/chroma deghosting and blending 220 shown in FIG. 2B can generate a chroma frame for post processing into a fused output with a luma frame. For ease of explanation, the generation of the label map here is described as being performed using the electronic device 101 of FIG. 1, although any other suitable electronic device in any suitable system may be used.

As a first step in the patch-based chroma blending 220, the electronic device 101 can divide the chroma plane into overlapping rectangular patches N×N (overlap by half), and search for the corresponding non-reference patch 415 in a non-reference frame 420 for each reference patch 425 in the reference frame 430. The search can be performed by the electronic device 101 using the local alignment information.

As a second step, the electronic device 101 can compute blending weights between corresponding patches. A Gaussian weight function could be used on the patch distance. Various equations described above can be modified to support the computation of the blending weights. For example, blending weights can be expressed as:

$$D = \frac{\sum_{i=1}^{N^2}(Cb_r - Cb_{nr})^2 + (Cr_r - Cr_{nr})^2}{2N^2} \quad (1)$$

$$W = e^{\left(-\frac{D}{2\sigma^2}\right)} \quad (2)$$

The distance (D) can be determined based on the coordinates (Cb and Cr) of a chroma plane. The difference between the coordinates of the reference patch 425 and the non-reference patch 415 can be determined by equation 1. The blending weight (W) of the patches can be determined based on equation 2.

FIG. 4B illustrates a window function 405 used in a third step of the blending 220. In the third step, the electronic device 101 can use the blending weights to blend the non-reference patch 415 with the reference path 425. To avoid boundary issues, a window function 405 can be imposed on the blending patch. The values of the patch in the blended chroma plane can be expressed as:

$$Cb_0 = \frac{Cb_r + W * Cb_{nr}}{1 + W} * win \quad (3)$$

$$Cr_0 = \frac{Cr_r + W * Cr_{nr}}{1 + W} * win \quad (4)$$

The $Cb_0$ and the $Cr_0$ are the values of the blended patch after the weight and window function 405 have been incorporated. The window function 405 provides a mathematical function where each pixel will have a summed value of "1" using the window function at each pixel at the end of the blending operation 220.

FIGS. 4A and 4B illustrate an example patch-based chroma blending in accordance with this disclosure. In particular, FIGS. 4A and 4B illustrate how the process 220 shown in FIG. 2B may be used to generate a chroma blended chroma frame. For ease of explanation, the generation of the blended chroma frame here is described as being performed using the electronic device 101 of FIG. 1, although any other suitable electronic device in any suitable system may be used.

Figure 5A:
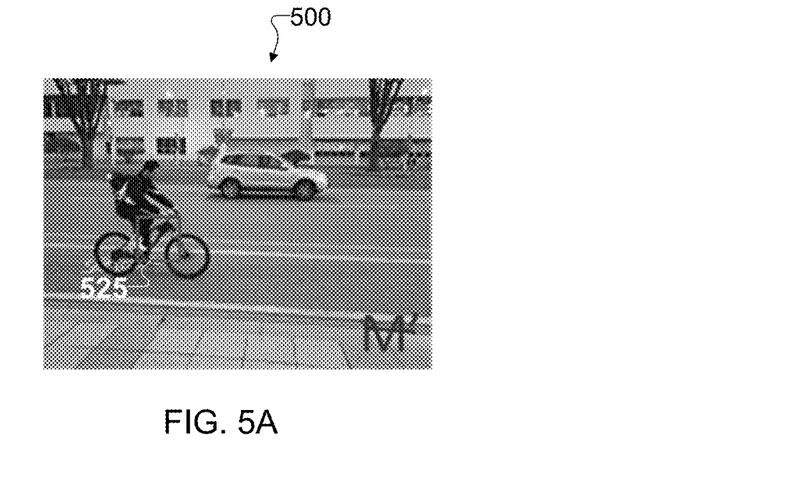
FIGS. 5A, 5B, 5C, 5D, and 5E illustrate an example frames in the process for generating a multi-frame blended image with reduced ghost artifacts in accordance with this disclosure.
Figure 5B:
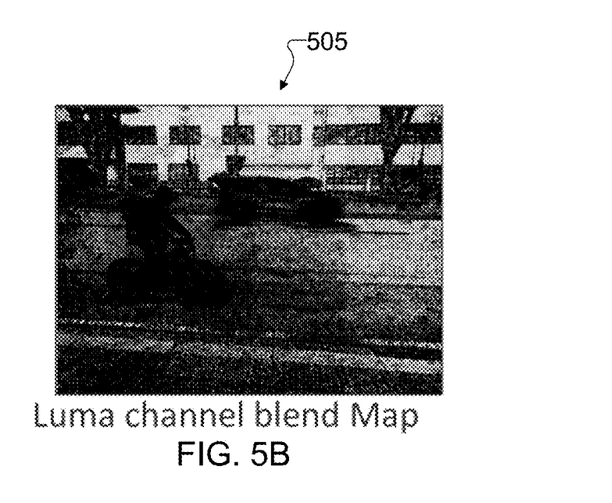
Figure 5C:
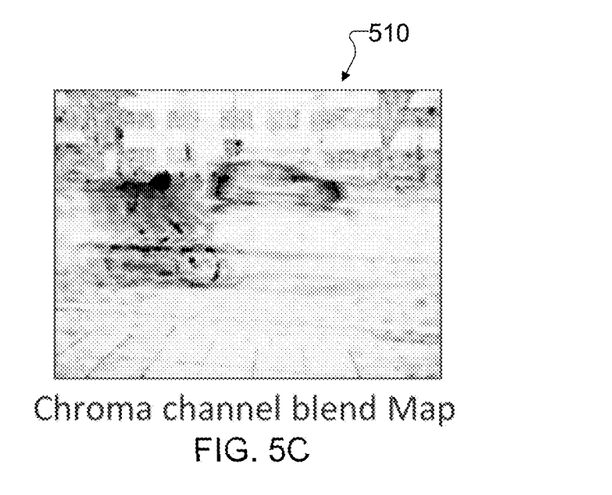
Figure 5D:
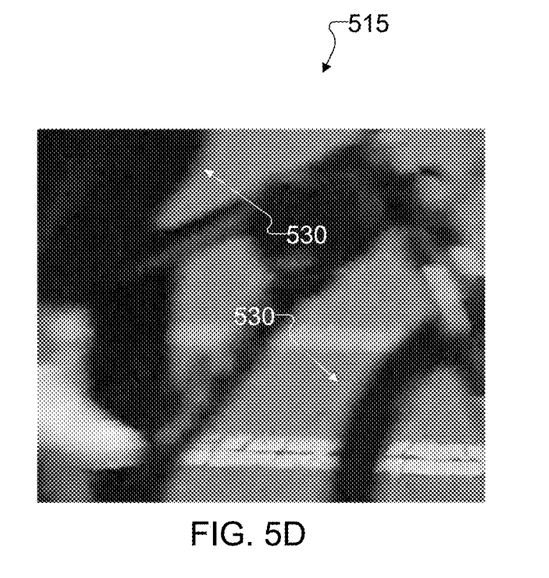
Figure 5E:
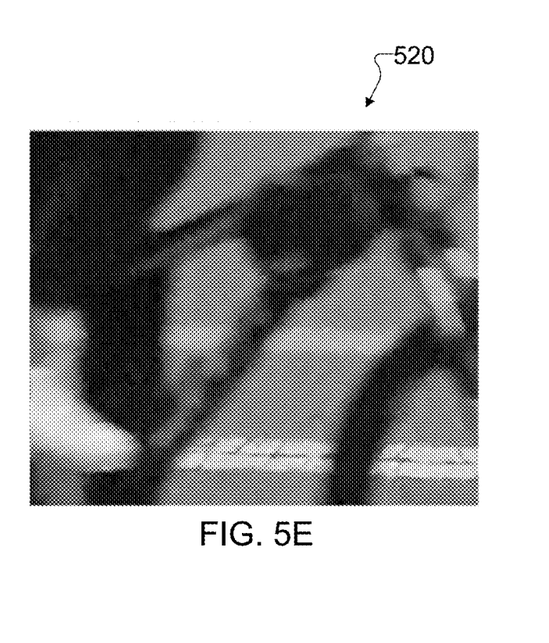

FIGS. 5A-5E illustrate an example frames in the process for generating a multi-frame blended image 520 with reduced artifacts 530 from combined ghosting-map image 515 in accordance with this disclosure. In particular, FIG. 5A illustrates an example scene 500 to be captured in accordance with this disclosure, where a patch 525 is highlighted in the final outputs of the combined ghosting-map image 515 and the multi-frame blended image 520 in FIGS. 5D and 5E. The combined ghosting-map image 515 is blended using a combined deghosting map, which can be the same as or similar to the deghosting map 320. As can be seen in FIG. 5D, an artifact 530 is present on the right knee of a person riding a bicycle and another artifact 530 on the outer edge of the front tire of the bicycle in the foreground of the scene. These artifacts 504 are caused by the fact that the bicycle and the person are in motion.

FIG. 5B illustrates an example luma channel blend map 505 used for generation of the luma frame 281 that is output from the luma/chroma deghosting and blending operation 220 shown in FIG. 2B, where the luma channel blend map 505 is used in the frame fusion operation 265 and the MFB operation 275. As can be seen in FIG. 5B, the detail in luma frame blend map is dark and not very detailed in the area of the patch 525. As a result, using only the luma channel blend map could possibly lead to artifacts. FIG. 5C illustrates an example chroma blending map 510 used for the generation of the chroma frame 261 output from the patch-based chroma blending 260 shown in FIG. 2B, where the chroma blending map 510 is used in the patch-based chroma blending 260 and the frame fusion 265.

Although FIGS. 3A through 5E illustrate various examples of image generation using a patch-based chroma blending, various changes may be made to FIGS. 3A through 5B. For example, FIGS. 3A through 5E merely illustrate examples of the types of results that could be obtained using the approaches described in this disclosure. Obviously, images of scenes can vary widely, and the results obtained using the approaches described in this patent document can also vary widely depending on the circumstances.

Figure 6:
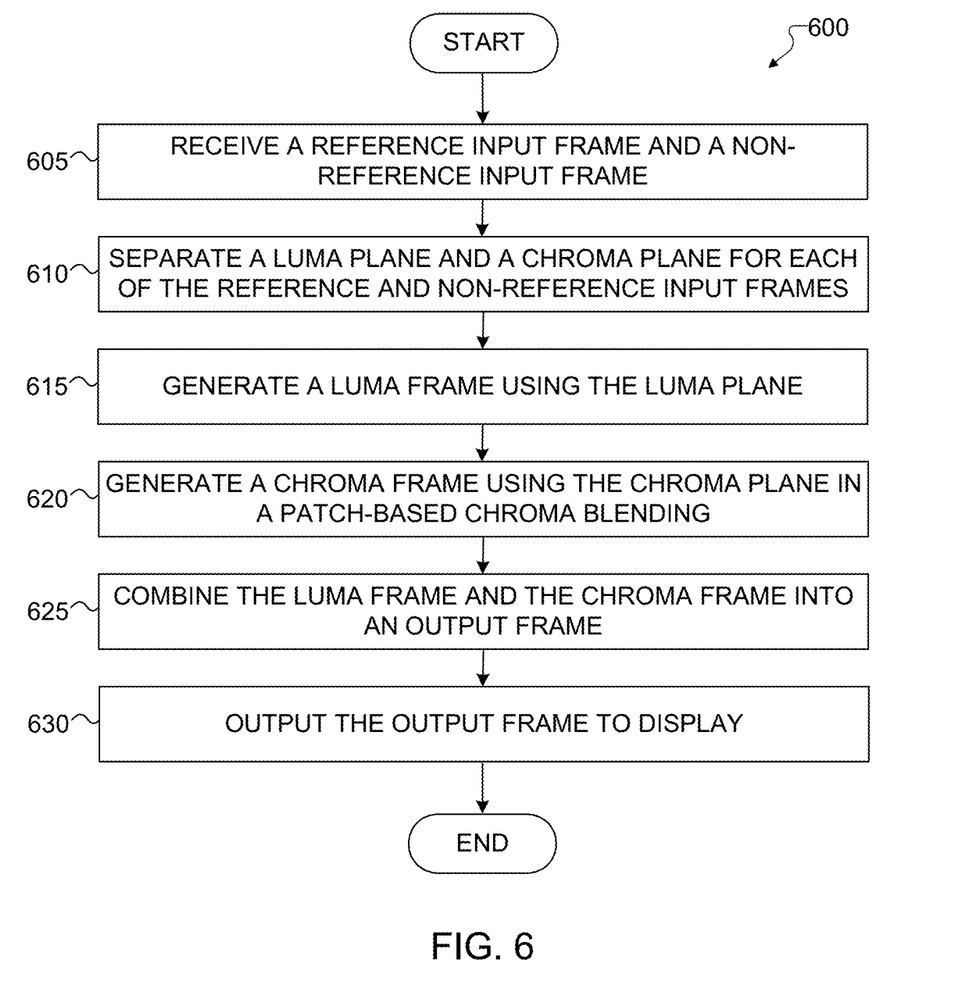
FIG. 6 illustrates an example method for chroma processing for multi-frame fusion in accordance with this disclosure.

FIG. 6 illustrates an example method 600 for chroma processing for multi-frame fusion in accordance with this disclosure. For ease of explanation, the method 600 shown in FIG. 6 is described as involving the performance of the process 200 shown in FIGS. 2A and 2B using the electronic device 101 shown in FIG. 1. However, the method 600 shown in FIG. 6 could be used with any other suitable electronic device and in any suitable system.

In operation 605, the electronic device 101 receives a reference input frame and a non-reference input frame. The reference frame and the non-reference frame can be taken from the same sensor or different sensors. When different sensors are used, the sensors can be the same type or different types. In operation 610, the electronic device 101 separates a luma plane for a luma channel and a chroma plane for a chroma channel for each of the reference input frame and the non-reference input frame. In operation 615, the electronic device 101 generates a luma frame using the luma plane. In operation 620, the electronic device 101 generates a chroma frame using the chroma plane in a patch-based chroma blending. The generation of the luma frame and the chroma frame are processed separately.

The patch-based chroma blending can include dividing the chroma plane for the reference input frame into reference patches and for the non-reference input frame into non-reference patches and searching each reference patch of the reference patches for a corresponding non-reference patch of the non-reference patches. The chroma plane can be divided into overlapping patches. The patch-based chroma blending further includes computing a blending weight between each reference patch and the corresponding non-reference patch. The patch-based chroma blending also includes blending the reference patches with the corresponding non-reference patches using the blending weight into the chroma frame. A window function can be used when blending the references patches with the corresponding non-reference patches. The window function is designed to sum to one on every pixel. The single blending weight is used for each patch in the chroma channel to increase a blending level. The same blending weight is used for both a Cb component and a Cr component to avoid color change. The blending weight is computed using a distance metric between corresponding patches to avoid potential ghost artifacts.

In operation 625, the electronic device 101 can combine the luma frame and the chroma frame into an output frame. In operation 630, the electronic device 101 can output the output frame to a display. The display can be the display of the electronic device 101 or an external display. It can also save the image to file or memory, transfer or transmit the image over a network to another device, or locally to another processor.

Although FIG. 6 illustrates one example of a method 600 for chroma processing for multi-frame fusion, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for luma and chroma deghosting and blending comprising:
   receiving, using a processor, a reference input frame and a non-reference input frame;
   separating, using the processor, a luma plane for a luma channel and a chroma plane for a chroma channel for each of the reference input frame and the non-reference input frame;
   generating, using the processor, a luma frame using the luma plane;
   generating, using the processor, a chroma frame using patches of multiple pixels from the chroma plane in a patch-based chroma blending, wherein the patch-based chroma blending comprises:
      dividing the chroma plane for the reference input frame into reference patches and the chroma plane for the non-reference input frame into non-reference patches;
      searching for a corresponding non-reference patch of the non-reference patches that corresponds to a reference patch of the reference patches; and
      blending the reference patch with the corresponding non-reference patch into the chroma frame; and
   combining, using the processor, the luma frame and the chroma frame into an output frame.

2. The method of claim 1, wherein:
   the patch-based chroma blending further comprises computing a blending weight between the reference patch and the corresponding non-reference patch; and
   blending the reference patch with the corresponding non-reference patch into the chroma frame uses the blending weight.

3. The method of claim 1, wherein the chroma plane is divided into overlapping patches.

4. The method of claim 1, wherein a window function is used when blending the reference patch with the corresponding non-reference patch.

5. The method of claim 4, wherein the window function is designed to sum to one on every pixel.

6. The method of claim 2, wherein a single blending weight is used for each patch in the chroma channel to increase a blending level.

7. The method of claim 2, wherein a same blending weight is used for both a Cb component and a Cr component to avoid color change.

8. The method of claim 2, wherein the blending weight is computed using a distance metric between the reference patch and the corresponding non-reference patch to avoid potential ghost artifacts.

9. An electronic device comprising:
   at least one sensor; and
   at least one processing device configured to:
      receive a reference input frame and a non-reference input frame;
      separate a luma plane for a luma channel and a chroma plane for a chroma channel for each of the reference input frame and the non-reference input frame;
      generate a luma frame using the luma plane;
      generate a chroma frame using patches of multiple pixels from the chroma plane in a patch-based chroma blending, wherein, to generate the chroma frame using the patches of multiple pixels from the chroma plane in the patch-based chroma blending, the at least one processing device is configured to:
divide the chroma plane for the reference input frame into reference patches and the chroma plane for the non-reference input frame into non-reference patches;
search for a corresponding non-reference patch of the non-reference patches that corresponds to a reference patch of the reference patches; and
blend the reference patch with the corresponding non-reference patch into the chroma frame; and
combine the luma frame and the chroma frame into an output frame.

10. The electronic device of claim 9, wherein:
to generate the chroma frame using the patches of multiple pixels from the chroma plane in the patch-based chroma blending, the at least one processing device is further configured to compute a blending weight between the reference patch and the corresponding non-reference patch; and
to blend the reference patch with the corresponding non-reference patch into the chroma frame, the at least one processing device is configured to use the blending weight.

11. The electronic device of claim 9, wherein the at least one processing device is configured to divide the chroma plane into overlapping patches.

12. The electronic device of claim 9, wherein the at least one processing device is configured to use a window function when blending the reference patch with the corresponding non-reference patch.

13. The electronic device of claim 12, wherein the window function is designed to sum to one on every pixel.

14. The electronic device of claim 10, wherein the at least one processing device is configured to use a single blending weight for each patch in the chroma channel to increase a blending level.

15. The electronic device of claim 10, wherein the at least one processing device is configured to use a same blending weight for both a Cb component and a Cr component to avoid color change.

16. The electronic device of claim 10, wherein the at least one processing device is configured to compute the blending weight using a distance metric between the reference patch and the corresponding non-reference patch to avoid potential ghost artifacts.

17. A non-transitory machine-readable medium containing instructions that when executed cause at least one processor of an electronic device to:
receive a reference input frame and a non-reference input frame;
separate a luma plane for a luma channel and a chroma plane for a chroma channel for each of the reference input frame and the non-reference input frame;
generate a luma frame using the luma plane;
generate a chroma frame using patches of multiple pixels from the chroma plane in a patch-based chroma blending, wherein the instructions that when executed cause the at least one processor to generate the chroma frame using the patches of multiple pixels from the chroma plane in the patch-based chroma blending comprise instructions that when executed cause the at least one processor to:
divide the chroma plane for the reference input frame into reference patches and the chroma plane for the non-reference input frame into non-reference patches;
search for a corresponding non-reference patch of the non-reference patches that corresponds to a reference patch of the reference patches; and
blend the reference patch with the corresponding non-reference patch into the chroma frame; and
combine the luma frame and the chroma frame into an output frame.

18. The non-transitory machine-readable medium of claim 17, wherein:
the instructions that when executed cause the at least one processor to generate the chroma frame using the patches of multiple pixels from the chroma plane in the patch-based chroma blending further comprise instructions that when executed cause the at least one processor to compute a blending weight between the reference patch and the corresponding non-reference patch; and
the instructions that when executed cause the at least one processor to blend the reference patch with the corresponding non-reference patch into the chroma frame comprise instructions that when executed cause the at least one processor to blend the reference patch with the corresponding non-reference patch using the blending weight.

19. The non-transitory machine-readable medium of claim 17, further containing instructions that when executed cause the at least one processor to divide the chroma plane into overlapping patches.

20. The non-transitory machine-readable medium of claim 17, further containing instructions that when executed cause the at least one processor to use a window function when blending the reference patch with the corresponding non-reference patch.

* * * * *